Nov. 5, 1957 W. C. RENNE 2,812,139
THERMOSTATIC MIXING VALVE
Filed July 23, 1954 3 Sheets-Sheet 1

INVENTOR.
William C. Renne
BY Hamilton & Hamilton
Attorneys.

Nov. 5, 1957

W. C. RENNE 2,812,139

THERMOSTATIC MIXING VALVE

Filed July 23, 1954

INVENTOR.
William C. Renne
BY
Hamilton & Hamilton
Attorneys.

Nov. 5, 1957   W. C. RENNE   2,812,139
THERMOSTATIC MIXING VALVE
Filed July 23, 1954   3 Sheets-Sheet 3
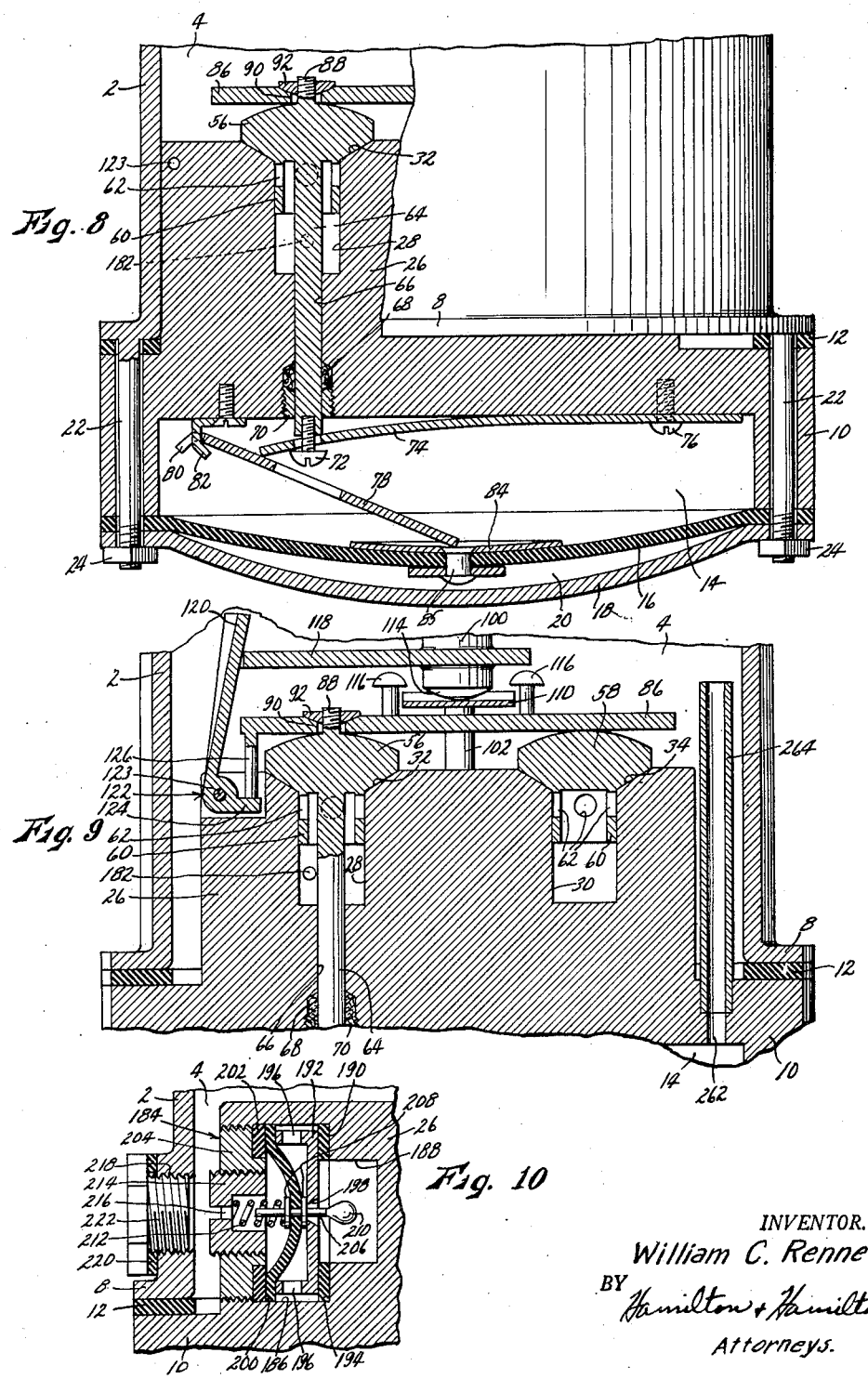
INVENTOR.
William C. Renne
BY
Hamilton & Hamilton
Attorneys.

United States Patent Office 2,812,139
Patented Nov. 5, 1957

2,812,139

THERMOSTATIC MIXING VALVE

William C. Renne, Kansas City, Mo.

Application July 23, 1954, Serial No. 445,397

7 Claims. (Cl. 236—12)

This invention relates to new and useful improvements in thermostatic mixing valves for water, and relates particularly to thermostatic mixing valves of the type wherein the hot and cold water are mixed in a chamber fed by hot and cold water inlet valves, these valves being operated to proportion the hot and cold water flows to give any desired temperature by a hydraulic motor powered by a stream of water diverted from one or both of the inlets, said diverted stream being regulated by a control valve operated by a bimetallic or other thermostatic element disposed in the mixing chamber.

In all prior valves of this type within my knowledge, any change of the inlet pressures of the hot or cold water results in a loss of control and resultant variation of the temperature of the water delivered by the valve. This is believed to be due to the fact that such a change of inlet pressure produces not only a change of the relative flow rates and the temperature of the resultant mixture of water, but also a change in the pressure available for operating the water motor to correct the temperature change, and these changes are not proportionate. As a result, said prior valves will maintain the water delivered thereby accurately at a set temperature only so long as the inlet pressures of the hot and cold water are maintained substantially constant. An important object of the present invention, therefore, is the provision of means for maintaining the pressure available for operating the hydraulic motor substantially constant despite extremely wide variations of the inlet pressures of the hot and cold water. In this manner the effects of pressure variations on the motor are virtually eliminated, leaving the actual temperature of the delivered water, acting through the thermostatic element, the sole fatcor which can affect or change the setting of the proportioning valves. This object is accomplished generally by the provision of an automatic pressure regulating valve in the passage through which water is directed to the hydraulic motor, whereby the pressure available for operating the motor is maintained constantly and uniformly at a fraction of the inlet pressure feeding the passage, well below the normal minimum value of said inlet pressure. The fact that the motor thus operates on a very low pressure is compensated by suitable hydraulic and mechanical amplification of the force supplied thereby.

Another important object is the provision of means rendering the motor operating pressure still more uniform and smooth by providing a substantially constant flow rate and uniform pressure in the passage communicating therewith, whether the motor is actually operating or not. This eliminates particularly the momentary pressure variations in said passage which would occur due to the operation of the pressure regulating valve at times when flow to the motor was started or stopped. This object is accomplished generally by the venting of the passage to the motor to the mixing chamber at a point downstream from the pressure regulating valve, and the provision of a throttling pilot valve regulating said vent, the pilot valve being controlled by the thermostatic element. Thus while the total flow through the control passage will remain substantially uniform and constant, and the pressure regulating valve will hence remain at a substantially fixed setting, the flow will be divided in various proportions between the vent and the motor, by regulation of the pilot valve.

Another object is the provision, in a mixing valve of the character above described in which the pressure regulating valve is vented to the mixing chamber so as to operate on differential pressures to maintain the control passage pressure at a fixed differential above the housing pressure, and wherein the hydraulic motor is also vented to the mixing chamber, so as to be operated by the pressure differential between the control passage and the mixing chamber. This provides that the temperature control will not be disturbed by variations in the mixing chamber pressure caused by changes in the back pressure at the valve outlet.

Another object is the provision, in a mixing valve of the character described, of novel means for preventing "hunting" of the temperature of the delivered water when a temperature change is signalled. This effect is caused, normally, by the fact that the response of the inlet valves is more rapid than the response of the bimetallic element, with the result that the temperature will overshoot the set value before the bimetallic element will respond to set the valves properly. When the bimetallic element then sets the valves to correct the overshoot, the temperature will overshoot the set level in the opposite direction, but not quite as far, and so on till the temperature finally levels off at the proper degree. This invention contemplates means for regulating the response speed of the valves to a rate nearly as slow as that of the bimetallic element, whereby virtually to eliminate overshooting and hunting.

A further object is the provision of a thermostatic mixing valve having means for providing alternative manual control of the delivery temperature, and wherein both the manual operation and the setting for thermostatic operation are accomplished by means of a single operating handle.

A still further object is the provision of a thermostatic mixing valve having means for regulating the total volume flow of the valve, the control of said regulating means, and of the temperature adjustment, being effected by a single operating handle.

A still further object is the provision of a thermostatic mixing valve having temperature adjustment means, means for manually controlling the delivery temperature, means for regulating the total flow of the valve, and a shut-off valve, the operation of all of said control means being effected by a single operating handle.

Other objects are relative simplicity and economy of structure, dependability and efficiency of operation, and effectiveness under nearly any conceivable set of conditions.

With these objects in view, as well as other objects which will appear in the course of the specification, reference will be had to the drawing, wherein:

Fig. 8 is an enlarged, fragmentary, slightly irregular sectional view taken on line VIII—VIII of Fig. 3, with parts broken away and parts left in elevation.

Fig. 9 is an enlarged fragmentary sectional view taken on line IX—IX of Fig. 3.

Fig. 10 is an enlarged fragmentary sectional view taken on line X—X of Fig. 2.

Figure 4:
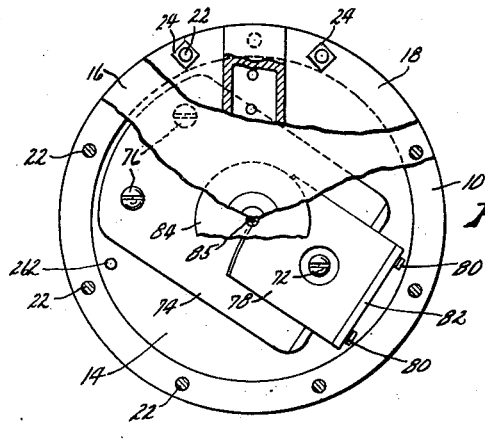
Fig. 4 is a rear elevational view of the valve, with parts broken away to show internal construction.

Like reference numerals apply to similar parts throughout the several views, and the numeral 2 applies to a housing or body member of hollow cylindrical form and forming the water mixing chamber 4 therein. Said housing has an integral forward end wall 6 with a central outlet opening 7 formed therein, and an outwardly extending peripheral flange 8 at its rearward end. A circular water motor block 10 having the same diameter as flange 8 is secured to the rearward face of said flange, a sealing gasket 12 being interposed therebetween. The rearward side of said motor block is concentrically recessed to form a motor cavity 14. A circular, flexible diaphragm 16 overlies the rearward face of the motor block, covering cavity 14, and is secured in place by a rearwardly convex cover plate 18, said diaphragm also forming a sealing gasket between the motor block and the cover plate. The space between diaphragm 16 and cover plate 18 will be designated motor cavity 20. Housing 2, gasket 12, motor block 10, diaphragm 16 and cover plate 18 are secured in assembled relation by a plurality of bolt studs 22 spaced peripherally about the housing, each of said studs being welded or otherwise attached at its forward end to flange 8 and extending sequentially through said gasket, the rim of the motor block, the diaphragm, and the cover plate, and having a nut 24 threaded thereon and engaging the rearward surface of the cover plate, as best shown in Figs. 4 and 8.

Motor block 10 has an integral forward extension which projects within housing 2 to form a valve block 26. A pair of forwardly opening bores 28 and 30 are formed in said valve block, in spaced relation to each other and to the axis of the housing (see Figs. 8 and 9). Tapered valve seats 32 and 34 surround the forward ends of said bores respectively. A lateral passage 36 (see Fig. 3) in valve block 26 interconnects with bore 28 inwardly from valve seat 32. A nipple 38 is threaded into said passage, and extends outwardly through a tubular lateral extension 40 of housing 2, and is adapted to be connected with a suitable source of hot water. A sealing gasket 42 is interposed between the outer end of extension 40 and an external flange 44 of the nipple. Similarly, a nipple 46 adapted to be connected with a suitable source of cold water extends through another lateral extension 48 of housing 2 and is threaded into a passage 50 of the valve block which communicates with the inner portion of bore 30, said nipple being provided with an external flange 52 engaging a sealing gasket 54.

As best shown in Figs. 8 and 9, bore 28 is provided with a hot water valve 56 and bore 30 is provided with a cold water valve 58, said valves being preferably made of metal and being tapered to fit the valve seats 32 and 34 respectively. Said valves are each provided with a rearwardly extending axial bearing sleeve 60 which engages slidably in the corresponding bore 28 or 30 to support the valve for movement toward or from its seat, said sleeve bearings having perforations 62 formed therein to permit the flow of water. The outer or forward faces of valves 58 and 60 are spherically convex, for a purpose which will presently appear. Hot water valve 56 is provided with an axial stem 64 which extends rearwardly and slidably through a bore 66 formed in valve block 26 into forward cavity 14 of the water motor. Packing 68 and a packing gland 70 surrounding said stem and threaded into block 26 prevent leakage of water around said stem. Within motor cavity 14 (see Figs. 4 and 8), stem 64 is loosely attached by screw 72 to the free end portion of a leaf spring 74, the opposite end of said spring being secured to the motor block by screws 76. Said spring is tensioned to hold hot water valve 56 normally closed against the inlet pressure of the hot water. Said spring is overcome, and valve 56 opened, by a lever 78 pivoted at one end to the motor block by the insertion of ears 80 integral therewith through holes formed in a bracket 82 fixed to the motor block, and bearing at a point intermediate its ends against the free end of spring 74. The opposite end of said lever bears against a large washer 84 secured to the forward face of diaphragm 16 by rivet 85. The point of contact of the lever with spring 74 is so positioned that said lever multiplies the force applied thereto by the diaphragm, in order to compensate for the low operating pressure of the motor, as will be described below.

Figure 3:
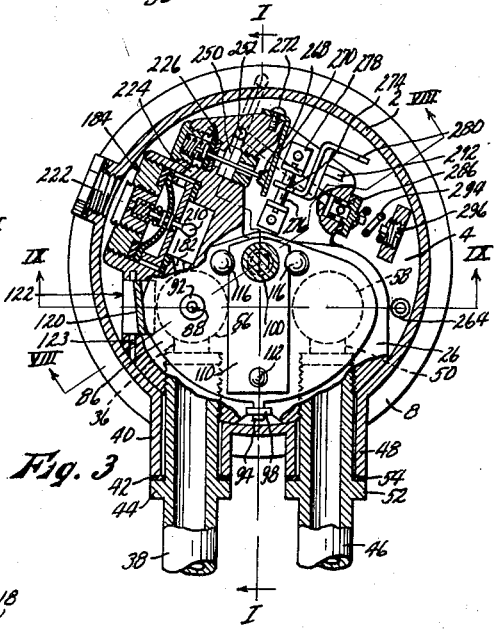
Fig. 3 is a sectional view taken on line III—III of Fig. 1, with parts broken away.

The relative openings of valves 56 and 58 are controlled by a planar rocker plate 86 disposed adjacent but spaced apart from the forward face of valve block 26, transversely to the axis of the housing, and contacting the convex forward faces of valves 56 and 58. Valve 56 is provided with a forwardly extending axial threaded stem 88 which extends through a hole 90 formed in the rocker plate, and is secured therein by a nut 92. The connection is sufficiently loose to permit rocking of the plate relative to the axis of the valve. On a line radial of housing 2, and forming the right-hand bisector of a line extending between the axes of valves 56 and 58, as best shown in Fig. 3, the rocker plate is provided at its outer edge with a small stub axle 94 which is engaged for universal pivotal movement in a hole 96 formed in an ear 98 integral with valve block 26. A spindle 100 disposed axially of housing 2 has a reduced rear end portion 102 (see Fig. 1) which is engaged for axial sliding movement in a socket 104 formed in valve block 26. Said reduced portion extends forwardly through a loosely fitting hole 106 formed in rocker plate 86, and through a loosely fitting hole 108 formed in the free end portion of a leaf spring 110 which is secured at its opposite end to the forward face of rocker plate 86 by rivet 112. Forwardly of said spring, spindle 100 is provided with a shoulder 114 which bears against the forward face of said spring. Said spring is pre-loaded toward the rocker plate by a pair of rivets 116 (Figs. 3 and 9) fixed in rocker plate 86 adjacent spindle 100, the heads of which overlap the forward face of the spring. The degree of pre-loading is such that when spindle 100 is moved rearwardly, by a mechanism to be described, rocker plate 86 will be pivoted rearwardly about stub axle 94 to force valves 56 and 58 closed before the spring is any further flexed.

On the other hand, when spindle 100 is moved forwardly, first enough to allow spring 110 to contact the heads of rivets 116 and then still further, rocker plate 86 is free to pivot forwardly to allow valves 56 and 58 to open, valve 56 by the operation of the water motor and valve 58 by the pressure of the cold water thereagainst. The degree of opening of valves 56 and 58 thus permitted is regulated by the distance spindle 100 is moved forwardly. When valve 56 is opened by the water motor, as will be described, it presses forwardly on the rocker plate, causing said rocker plate to tilt about a radial axis passing through stub axle 94 and the spindle, thus moving the cold water valve toward its closed position. The hot and cold water flow rates are thus proportioned to provide the desired delivery temperature, the operation of the motor being thermostatically controlled.

The rocker plate 86 may also be tilted manually to provide hand control of the delivery temperature by means of a cam plate 118 of generally segmental shape fixed on spindle 100 forwardly of rocker plate 86, the outer edge of said cam plate being generally spirally disposed relative to the spindle. Said outer edge engages the forwardly projecting arm 120 (see Fig. 9) of an angled lever 122 pivoted at 123 in valve block 26 adjacent the hot water valve 56. The inwardly projecting arm 124 of said lever projects behind the adjacent edge of rocker plate 86, and is engaged by a rod 126 fixed to the rocker plate and extending rearwardly therefrom. Thus when spindle 100 is rotated in a clockwise direction as viewed in Fig. 2, cam 118 engages and pivots lever arm 120 outwardly and lever arm 124 forwardly, tilting rocker arm 86 to open hot water valve 56 and close cold water valve 58 to proportion the flows to provide the desired temperature. This manual control of course does not operate simultaneously with the thermostatic control provided by the water motor, as will appear.

A thermostatic element 128 having the form of a bimetallic strip is disposed within mixing chamber 4 forwardly of cam 118. It is arranged in spiral form about the spindle 100, being fixed at its inner end to said spindle and having its outer end portion bent to form a radially extending finger 130, which controls the action of the water motor as will be described below. A rising temperature of the water surrounding the bimetallic strip will cause clockwise movement of finger 130, as viewed in Fig. 2, and a falling temperature will cause a counter-clockwise movement of the finger.

Figure 5:
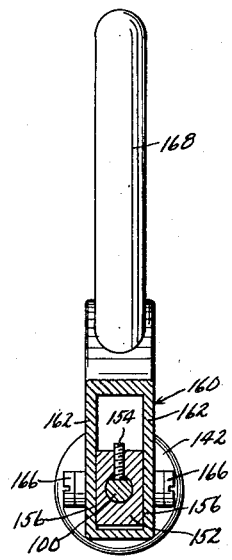
Fig. 5 is a sectional view taken on line V—V of Fig. 1.
Figure 6:
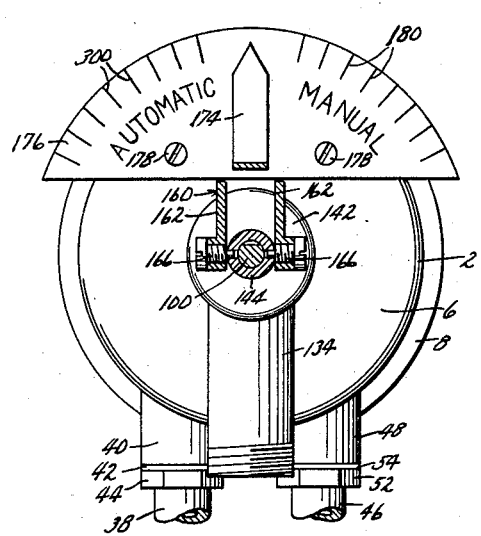
Fig. 6 is a sectional view taken on line VI—VI of Fig. 1.

Spindle 100 extends forwardly through the outlet opening 7 of housing 2, and thence still further forwardly through a tubular extension 132 (see Fig. 1) of the housing. A tubular discharge pipe 134 formed integrally with housing 2 interconnects at its upper end with extension 132, and is externally threaded at its lower end for connection to any pipe or fixture to which it is desired to deliver the tempered water. Within housing extension 132, a valve disc 136 is rigidly fixed to spindle 100, and cooperates with a rubber seat member 138 to close outlet opening 7 when the spindle is moved rearwardly, and to uncover said opening when the spindle is moved forwardly. Spindle 100 extends forwardly through extension 132, and through a hole 140 formed in the end wall of a cup-shaped cap 142 threaded on the outer end of said extension. A sleeve 144 disposed about spindle 100 also extends through cap hole 140, extending forwardly of said cap, and is provided at its rearward end with a flange 146 which bears rotatably against the inner surface of the cap. Packing 148 is compressed between flange 146 and a washer 150 which bears against the forward end of extension 132. A cam follower 152 is threaded on the forwardly extended end of spindle 100, and is secured against rotation thereon by set screw 154. Said cam follower has parallel sides 156 (Fig. 5) parallel to spindle 100, and an arcuately curved forward end 158. A hollow cam 160 surrounds the cam follower, having parallel side walls 162 slidably engaging the sides 156 of cam follower 152, and an arcuate forward wall 164 the inner surface of which engages the arcuate end 158 of the follower. Side walls 162 are disposed at their rearward edge portions on opposite sides of sleeve 144, and are respectively pivoted thereto by threaded pivot pins 166, said pivot pins being coaxial and disposed transversely to spindle 100. Cam 160 is manually manipulated by a handle 168 secured thereto by screw 170. The forward cam wall 164 is disposed eccentrically to the axis of pins 166. Spindle 100 is urged forwardly at all times by a compression spring 172 disposed about the spindle between cam follower 152 and the forward end of sleeve 144. An indicator finger 174 is mounted on spindle 100 for axial sliding movement but is secured against rotation thereon, being secured between the forward end of sleeve 144 and spring 172. Said finger extends rearwardly adjacent cap 142 and housing extension 132, and terminates adjacent an indicator plate 176 secured to the forward end of housing 2 by screws 178, as best shown in Fig. 6.

Thus when cam 160 is tilted forwardly and downwardly by handle 168, spindle 100 will be moved forwardly as cam wall 164 rides over the follower 152, by the pressure of springs 172 and 110, eventually permitting rocker plate 86 to pivot forwardly and hot and cold water valves 56 and 58 to open. It will be noted, however, that during the initial forward movement of the spindle, only the main shut-off valve 136 will be opened, since spring 110 on the rocker plate has sufficient tension to hold valves 56 and 58 closed. Only after the spindle has moved forward sufficiently to relax spring 110 against the heads of rivets 116 will the rocker plate move and valves 56 and 58 be permitted to open. Since valve 136 is thus full open before valves 56 and 58 begin to open, the former cannot create any back pressure in the housing which might interefere with the operation of the latter. At this point of operation, however, only the cold water valve 58 will open, the hot water valve 56 being held closed by spring 74 of the water motor. If the cam handle 168 is turned in a clockwise direction, so that indicator finger 174 moves to the "Manual" side of indicator plate 176 (see Fig. 6), spindle 100 and cam plate 118 will be correspondingly turned, and said cam plate will engage and pivot lever 122 to open the hot water valve 56 as previously described, simultaneously tilting rocker plate 86 to cause a proportionate closure of the cold water valve 58. The final temperature of the mixed water will depend on the degree the spindle is turned in a clockwise direction, which may be read by the relationship of finger 174 to suitable indicia 180 imprinted on the indicator plate 176. The total volume of flow is regulated by the degree to which the handle 168 is pivoted forwardly.

The use of the separate main shut-off valve 136, rather than the use of valves 56 and 58 for this purpose, is made desirable by the fact that valves 56 and 58 should have metal seats and discs in the interests of continued accurate control of flow and temperature, and that full and complete closure of such valves is very difficult to obtain. Valve 134, however, has a soft rubber seat, and can easily provide a sealing closure.

Turning of operating handle 168 in a counterclockwise direction provides thermostatic control of the water temperature, as will now be described. A control stream of water for this purpose is derived from the hot water inlet through a passage 182 formed in valve block 26. Being shown in Figs. 3, 8 and 9 this passage communicates at one end with bore 28 of the valve block at a point ahead of or upstream from hot water valve 56, so as to be furnished with water regardless of whether said valve is open or closed. Said passage communicates at its opposite end with a pressure reducing and regulating mechanism 184 which is shown generally in Fig. 3, but is best shown in Fig. 10. Referring to Fig. 10, it will be seen that said mechanism is enclosed in a bore 186 formed in valve block 26, the inner end portion 188 of said bore being reduced in diameter to form a shoulder 190. Passage 182 communicates with said reduced portion (see Fig. 3). An outwardly opening cup 192 of less diameter than bore 186 is seated on shoulder 190, a sealing gasket 194 being interposed therebetween. The rim of said cup has holes 196 formed therein communicating with bore 186, and a valve opening 198 formed centrally in the floor thereof. A flexible diaphragm 200 seals the open outer end of said cup, being secured in place by a sealing gasket 202 and a cap 204 threaded into the outer end of bore 186. A valve stem 206 affixed centrally in diaphragm 200 by collars 208 extends through valve opening 198 and has a valve head 210 affixed thereto within portion 188 of the bore. Said valve is operable to enter and close valve opening 198 when the diaphragm 200 is moved outwardly, or to the left as viewed in Fig. 10. Said diaphragm is normally urged to the right to open the valve by a compression spring 212 bearing at one end against one of collars 208 and at its opposite end against a plug 214 adjustably threaded into cap 204. Said plug has a hole 216 formed therethrough communicating with the mixing chamber 4. Said plug is accessible for adjustment through an opening 218 in housing 2, said opening being normally sealed by a gasket 220 and plug 222. Water leaves the regulator through a passage 224 (see Fig. 3) formed in valve block 26 and communicating with bore 186 adjacent cup 192.

Water flows into valve bore 188 and through valve opening 198 into cup 192, exerting pressure on the inner surface of diaphragm 200. Any pressure existing in the mixing chamber 4 enters through hole 216 and is exerted on the outer surface of diaphragm. Water flowing through the regulator is also eventually discharged into the mixing chamber, as will be described. The regulator thus operates on the differential of pressures between the two sides of the diaphragm, and will maintain the flowing pressure in the water delivered by regulator at a fixed differential above the mixing chamber pressure. This difference is represented by the tension of spring 212, and may be adjusted by varying the tension of said spring by turning plug 214. The difference is maintained at a level far below the normal minimum inlet pressure of the hot water, so as to be unaffected by pressure changes in the supply pipes. A differential of 4 or 5 p. s. i. has been found satisfactory in most cases, but this may of course be varied in particular circumstances.

Figure 1:
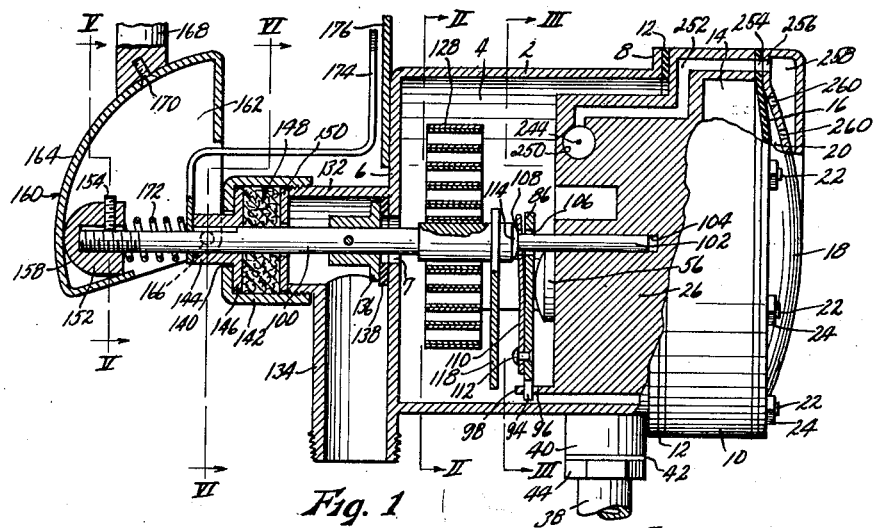
Fig. 1 is a vertical, longitudinal, mid-sectional view of a thermostatic mixing valve embodying the present invention, being taken on line I—I of Fig. 3, with parts broken away and parts left in elevation.
Figure 7:
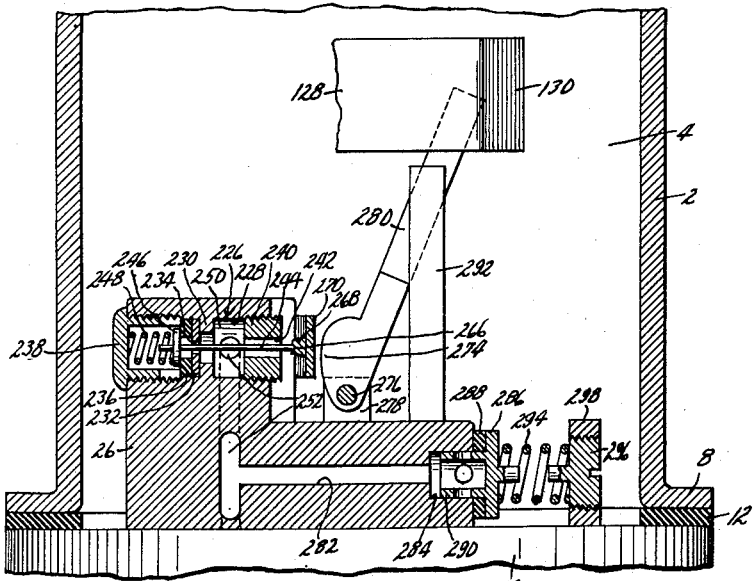
Fig. 7 is a slightly irregular enlarged fragmentary sectional view taken on line VII—VII of Fig. 2, with parts broken away and parts left in elevation.

Water flowing from regulator valve 184 through passage 224 enters a cut-off and pilot valve assembly 226 shown generally in Fig. 3 but best shown in Fig. 7. It is mounted in a bore 228 in valve block 26 which is open at both ends and has an internal flange 230 intermediate its ends. An orifice disc 232 having an orifice 234 formed centrally therein is seated against one side of said flange, and an annular valve seat member 236 is disposed outwardly of said orifice disc. Said orifice disc and valve seat are held in place by a hollow cap 238 threaded in one end of bore 228. The passage 224 from the regulator valve communicates with the interior of said cap. The end of bore 228 opposite cap 238 is closed by a threaded plug 240 having a pilot valve opening 242 formed centrally therein. A valve stem 244 extends axially in bore 228, passing through orifice 234 and pilot opening 242. Within hollow cap 238, a valve disc 246 is secured to said stem within said cap, and is adapted to engage valve seat 236 to close the entrance to orifice 234 whenever the stem is moved to the right as viewed in Fig. 7. Said valve is urged toward its closed position by a compression spring 248 bearing at one end against disc 246 and at its opposite end against cap 238. The chamber 250 formed in bore 228 between orifice disc 232 and pilot plug 240 is interconnected by a passage 252 formed in valve block 26 with motor cavity 20. As best shown in Fig. 1, said passage extends from chamber 250 through the rim portion of motor block 10, through a hole 254 adjacent the edge of diaphragm 16, and through a hole 256 of cap 18 into a chamber 258 formed by a rearward extension of cap 18. Chamber 258 communicates with rear motor cavity 20 through holes 260 in cap 18. Forward motor cavity 14 is vented to mixing chamber 4 through a hole 262 formed in the motor block (see Fig. 9). A tube 264 inserted in said hole extends forwardly of motor block 26.

Figure 2:
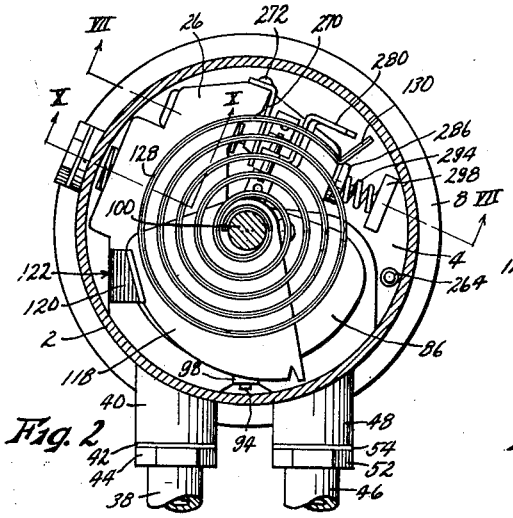
Fig. 2 is a sectional view taken on line II—II of Fig. 1.

Referring again to Fig. 7, it will be seen that valve stem 244 extends outwardly from pilot valve plug 240, and engages pivotally in a socket 266 formed in the smaller end of a tapered pilot valve 268 which is fixed to the free end portion of a leaf spring 270, the opposite end of said leaf spring being secured to valve block 26 by screw 272 (see Fig. 2). Valve 268 is adapted to restrict and close the pilot valve opening 242 of plug 240 when spring 270 is flexed toward said plug, and said spring is tensioned to move said valve toward its closed position, but is normally overcome by compression spring 248. Valve 268 is operable by a cam 274 fixed on an axle 276 which is oscillatably supported between a pair of brackets 278 fixed to the forward face of valve block 26, said axle being disposed approximately radially to spindle 100, as shown in Fig. 3. Cam 274 is provided with an extension arm 280 which extends forwardly into the circular path of radial finger 130 of bimetallic member 128, as best shown in Figs. 2, 3 and 7, and which is disposed in a counter-clockwise direction from said finger. A post 292 affixed to valve block 26 limits the movement of cam arm 280 in a direction opposite to its valve opening movement.

The passage 252 through which control water is led to motor cavity 20 is provided, as best shown in Fig. 7, with a branch passage 282 which terminates in an enlarged bore 284 opening into mixing chamber 4. A relief valve 286 having a yieldable disc 288 is provided with a perforated tubular stem 290 which is disposed slidably in bore 284. Said valve is urged inwardly to its closed position by a spring 294 bearing at one end against valve 286 and at its opposite end against a plug 296, adjustably threaded in a post 298 integral with motor block 10.

A description of the thermostatic operation of mixing valve is substantially as follows. First, it will be seen that when the valve is entirely closed by main shut-off valve 136, and if the hot and cold water valves 56 and 58 do not close perfectly tight, the mixing chamber 4 will be filled with water at full line pressure. This is not injurious, however, since all parts of the system are subjected to the same pressure, including both sides of motor diaphragm 16 and both sides of pressure regulating diaphragm 200. The operator then pivots operating handle 168 forwardly as previously described in connection with the manual operation thereby moving spindle 100 forwardly to open the main shut-off valve 136 and pivot rocker plate 86 forwardly to permit the opening of main valves 56 and 58. The pressure in all parts of the system, including both sides of motor diaphragm 16, which are vented to the mixing chamber, immediately drops to whatever the mixing chamber pressure is at that time, with the exception of course of the hot and cold water inlets and the regulator valve 184 which is connected to the hot water inlet. Also as previously described, only the cold water valve 58 opens at this time, hot water valve 56 being maintained closed by the motor spring 74.

The operator then turns operating handle 168 in a clockwise direction, or so that indicator finger 174 moves toward the "Automatic" side of indicator plate 176. This turns spindle 100 and bimetallic element 128 correspondingly, and causes finger 130 of said bimetallic element to engage and pivot cam arm 280, causing cam 274 to engage pilot valve spring 270 and force pilot valve 268 toward valve opening 242. During the initial portion of the movement of said valve it pushes stem 244 to open the control shut-off valve 246, thereby permitting a flow of water from the regulator valve 184 through orifice 234 into chamber 250, and thence through pilot valve opening 242 into the mixing chamber. The orifice 234 is substantially smaller than opening 242, and forms a flow restriction which maintains back pressure on the regulator when the pilot valve is entirely open. The length of stem 244 is such that shut-off valve 246 will be entirely opened before the pilot valve 268 enters or in any way restricts the flow of water through opening 242. The main purpose of shut-off valve 246 is to prevent the flow of water through the control passages when the mixing valve is to be operated manually, and it would also serve to shut off the flow of water in the control passage if the mixing valve were not provided with a main shut-off valve 136. It will be apparent that if the main inlet valves 56 and 58 were of a type which afforded a complete closure, no main shut-off valve would be required.

Thus as soon as shut-off valve 246 is opened, a steady flow of control water is initiated through regulator 184, passage 224, orifice 234, and opening 242, the effective flow pressure thereof, or the excess of pressure therein above the mixing chamber pressure, being equal to the differential setting of the regulator. This flow pressure, and hence the volume of the control water, will remain substantially constant in spite of changes in the supply pressure or changes in the back pressure occurring in the mixing chamber, due to the action of the regulator valve, and will furthermore remain substantially constant whether the pilot valve 268 is closed, open, or restricted as will appear. As long as the pilot valve is entirely open, substantially the entire pressure drop between the regulator and the mixing chamber, will occur at orifice 234, and the chamber 250 will be substantially at mixing chamber pressure, there being only enough excess pressure in chamber 250 to maintain a flow of water to the mixing chamber.

As the operator turns handle 168 still further in a counter-clockwise direction, cam 274 operates to force pilot valve into or adjacent valve opening 242, thereby restricting the flow of control water therethrough, so that the pressure drop from regulator to mixing chamber occurs partially at orifice 234, and partially at the pilot valve. The pressure drop occurring at the pilot valve of course causes a pressure increase in chamber 250 intermediate the orifice and pilot valve. This causes a portion of the control water to be diverted from the pilot valve to passage 252 and thence to motor cavity 20, forcing diaphragm 16 forwardly and exhausting water from motor cavity 14 through hole 262 and tube 264 to the mixing chamber. The forward movement of the diaphragm operates lever 78 to force spring 74 and stem 64 of hot water valve 56 forwardly, opening said valve. Valve 56 tilts rocker plate 86 to cause a corresponding closure of cold water valve 58, as previously described, thereby proportioning the relative hot and cold water flow rates to move the temperature of the mixture toward the level for which the bimetallic element has been set.

The mixture of hot and cold water of course surrounds bimetallic element 128 in the mixing chamber, and as the temperature thereof rises in response to the opening of hot water valve 56, will cause the finger 130 of said bimetallic element to turn in a clockwise direction as viewed in Fig. 2. This permits a pivotal movement of cam arm 280, allowing pilot valve 268 to open gradually. As said pilot valve opens, the pressure drop thereacross, and hence the pressure in chamber 250, gradually decreases. Finally, a balance point will be reached at which the pressure drop across the pilot valve will just equal the motor pressure necessary to maintain the motor diaphragm stationary. The temperature of the mixture when this balance occurs of course depends on the angular distance through which the bimetallic element was originally turned. The "Automatic" side of indicator plate 176 is suitably calibrated by indicia 300 (Fig. 6), so that any desired temperature may be produced.

If, after the balance point has been attained and the valve is delivering water at a uniform temperature, the inlet pressure of the hot water should either rise or fall, the flow pressure to the pilot valve, and hence the rate of flow and motor pressure will be maintained substantially constant by the regulator valve 184. Variations of inlet pressure thus are eliminated as direct causes of operation of the water motor, and do not in and of themselves affect the setting of the inlet valves. If, however, as is usually the case, the change of inlet pressure affects the temperature of the mixture being delivered by the valve, it will change the setting of the valves 56 and 58 by causing the movement of bimetallic element 128. If the temperature falls, said bimetallic element turns in a counter-clockwise direction, operating cam 274 to throttle pilot valve 268 still further. This causes a higher pressure in chamber 250, and a resultant flow through passage 252 to motor cavity 20, forcing stem 64 of valve 56 forwardly to open said valve to provide a greater proportion of hot water, and simultaneously operating through rocker plate 86 to throttle cold water valve 58 to provide a smaller proportion of cold water. When the mixture again approaches the desired temperature, the pilot valve will again be opened sufficiently to strike the balance previously described to prevent further movement of the motor. If on the other hand the temperature of the mixture should rise, the bimetallic element will turn in a clockwise direction to permit further opening of pilot valve 268. This causes a reduction of pressure in chamber 250 and motor cavity 20, with the result that motor diaphragm 16 will be forced rearwardly by spring 74, resetting the valves 56 and 58 to provide a cooler mixture and exhausting water from motor cavity 20 through passage 252 and pilot valve opening 242 to the mixing chamber. When the mixture temperature has fallen to the set temperature, counter-clockwise movement of the bimetallic element will again throttle the pilot valve to prevent further operation of the motor. This operation for correcting temperature variations will be the same whether said variations occur as a result of changes of inlet pressure or of inlet temperatures.

Since regulator valve 184 works on differential pressures, so as to maintain the flow of pressure of the control stream at a predetermined pressure above the mixing chamber pressure, and since the motor also operates on differential pressure, being vented to the mixing chamber, it is apparent that the effective pressure on and flow to the motor is not affected by mixing chamber pressure. Variations of back pressure in this chamber, due to the fixtures to which water is being supplied by the valve, are quite common and have heretofore been a constant source of trouble in providing accurate temperature control.

In the present valve the water motor operates on a very small pressure and low flow rate, the maximum pressure being of differential setting of regulator valve 184, and the actual pressure being usually less since the pilot valve is never or seldom completely closed. However the force provided by this low pressure is amplified sufficiently to provide adequate force for operating the inlet valves by the large area of the motor diaphragm, and by lever 78.

The speed of response of the valve to temperature changes is another important factor in the operation of the valve, and is generally the resultant of the speed of response of the thermostatic element to changes of temperature, and the speed with which the inlet valves respond to pressure changes in the water motor, the latter generally being much more rapid than the former. The bimetallic element 128 may be given a more rapid rate of response by making it as thin as practical and still provide the necessary mechanical force. In the present valve the bimetallic element operates a pilot valve controlling only a very small flow at low pressure, and hence may be very light and thin. However, even then the bimetallic element would respond more slowly to temperature changes than the inlet valves in the usual mixing valve, wherein the water motor is connected to an inlet at full pressure. In the present valve the response of the inlet valves to pressure changes on the motor is slowed almost to the speed of response of the bimetallic element by the fact that the flow to the motor is very slow and at low pressure, by the relatively large volume of the motor which requires a greater total flow thereto to effect a change of position, and by the lever 74. This virtually eliminates "hunting," which occurs in most mixing valves when the bimetallic element is manually set to provide a new temperature. In many valves, this causes an almost instantaneous response of the inlet valves, and the temperature overshoots the set level before the bimetallic element can respond. In the present valve, the valve response may be almost as slow as that of the bimetallic element. If "hunting" should develop, it may be eliminated by adjusting spring 212 of the regulator to less tension by turning plug 214. This reduces the pressure available for operating the water motor, and thus also reduces the flow rate to said motor and lowers its speed of response.

Relief valve 286, which is connected to motor supply passage 252 by passage 282, prevents overloading of the motor in the event that the pilot valve should stick shut, and the regulator valve should fail to close completely. It should be set to open at the maximum safe operating pressure of the motor.

It will be noted in Fig. 2, in which the spindle 100 is at its neutral or "off" position, that the manual and thermostatic operating mechanisms cannot function simultaneously. If the spindle is turned clockwise to bring cam plate 118 into operation against lever 122 for manual operation, then finger 130 of the bimetallic element moves away from pilot valve cam arm 280. If the spindle is turned counter-clockwise to cause bimetallic finger 130 to engage and operate pilot valve cam arm 280 for thermostatic operation then manual cam 18 moves away from lever 122.

This valve has been thoroughly tested and found very effective. It will produce a stream of water at any desired temperature between the temperatures of the hot and cold water inlets, and maintain that temperature accurately despite rapid and substantial changes of either or both of the inlet pressures or temperatures, and despite changes of the back pressure existing in the mixing chamber. While I have shown and described a specific embodiment of my invention, it will be apparent that many minor changes of structure and operation could be made without departing from the spirit of the invention as defined by the scope of the appended claims.

What I claim as new and desire to protect by Letters Patent is:

1. A thermostatic mixing valve comprising a housing having hot and cold water inlet openings and an outlet opening, hot and colt water valves respectively controlling said inlet openings and having substantially parallel movement into said housing as they open, a spindle carried for longitudinal movement in said housing and having a shoulder formed thereon, said hot and cold water inlets and valves being spaced apart from said spindle, a rocker plate engaging both of said valves, being supported by said spindle and being universally pivoted in said housing at a point spaced radially from said spindle along a line intersecting the space between said valves, said line serving as a first axis about which said plate is tilted by the opening of one of said valves whereby to cause a corresponding closure of the other valve, and whereby as said spindle is moved longitudinally in one direction the shoulder thereof will engage and pivot said plate about a second axis transverse to said first axis to force both of said valves closed, manually operable means for moving said spindle longitudinally whereby to close said valves or to limit the opening thereof to adjust the total flow volume of the valves, and thermally responsive means responsive to the temperature of the water mixture in said housing and including a water motor operative to control one of said valves, whereby to maintain said mixture temperature substantially constant.

2. A thermostatic mixing valve as set forth in claim 1 wherein said spindle is angularly oscillatable as well as longitudinally movable, and wherein said thermally responsive means includes a thermostatic element mounted on said spindle within said housing and operable by the angular movement of said spindle to adjust said thermally responsive means to vary the output temperature of said mixing valve, and including manual means for turning said spindle.

3. A thermostatic mixing valve as set forth in claim 1 wherein said spindle is angularly oscillatable as well as longitudinally movable, and wherein said thermally responsive means includes a thermostatic element mounted on said spindle within said housing and operable by the angular movement of said spindle in one direction from a neutral position to adjust said thermally responsive means to vary the output temperature of said mixing valve, and with the addition of a lever pivoted in said housing and operable when actuated to engage and pivot said rocker plate about its first axis to proportion said valves, and a cam fixed on said spindle and operable by the turning of said spindle in the opposite direction from its neutral position to engage and actuate said lever.

4. A thermostatic mixing valve as set forth in claim 1 wherein said spindle extends through the outlet opening of said housing, and with the addition of an outlet valve member mounted on said spindle, said outlet valve being operable by the longitudinal movement of said spindle to close when said spindle is moved to pivot said rocker plate about said second axis to close said hot and cold water inlet valves, and to open when said spindle is moved to allow the pivoting of said rocker plate to open said inlet valves.

5. A thermostatic mixing valve as set forth in claim 1 wherein said spindle extends through the outlet opening of said housing, and with the addition of an outlet valve member mounted on said spindle, said outlet valve being operable by the longitudinal movement of said spindle to close when said spindle is moved to pivot said rocker plate about said second axis to close said hot and cold water inlet valves, and to open when said spindle is moved to allow the pivoting of said rocker plate to open said inlet valves, and a compression spring interposed between said spindle and said rocker plate and preloaded to a sufficient tension that said rocker plate will close said inlet valves before said spring is further compressed, said outlet valve being so positioned on said spindle that said spring must be further compressed before said outlet valve is closed.

6. A thermostatic mixing valve comprising a housing having hot and colt water inlet openings and an outlet opening, hot and cold water valves respectively controlling said inlet openings and having substantially parallel movement into said housing as they open, a spindle carried for rotational movement in said housing and having a shoulder formed thereon, said hot and cold water inlets and valves being spaced transversely from said spindle, a rocker plate engaging both of said valves, being supported by said spindle shoulder and being universally pivoted in said housing at a point spaced radially from said spindle along a line intersecting the space between said valves, said line serving as an axis about which said plate is tilted by the opening of one of said valves thereby to cause a corresponding closure of the other valve, and thermally responsive means carried by said housing and being responsive to the temperature of the water mixture in the housing, said means including a water motor operative to control the opening of one of said valves whereby to maintain said mixture at a substantially uniform temperature, said thermally responsive means also including a thermostatic element mounted on said spindle within said housing and operable by the rotation of said spindle to adjust the delivery temperature of said mixing valve, and manual means for turning said spindle.

7. A thermostatic mixing valve as set forth in claim 6 wherein said spindle has a neutral position with respect to its angular rotation wherein said thermally responsive means is rendered inoperative, and wherein said means is rendered operative by the rotation of said spindle in one direction from its neutral position, and with the addition of a lever pivoted in said housing and operative when actuated to engage and pivot said rocker plate to proportion the openings of said valves, and a cam fixed on said spindle and operable to engage and actuate said lever when said spindle is turned in the opposite direction from its neutral position.

References Cited in the file of this patent

UNITED STATES PATENTS

| | | |
|---|---|---|
| 1,195,722 | Powers | Aug. 22, 1916 |
| 1,868,555 | Wiley | July 26, 1932 |
| 2,193,581 | Clokey | Mar. 12, 1940 |
| 2,430,133 | Muffly | Nov. 4, 1947 |
| 2,449,766 | Brown | Sept. 21, 1948 |
| 2,657,860 | Schmidt | Nov. 3, 1953 |

FOREIGN PATENTS

| | | |
|---|---|---|
| 500,008 | Great Britain | Feb. 1, 1939 |
| 720,112 | France | Dec. 3, 1931 |